US008628119B2

(12) United States Patent
Hasunuma et al.

(10) Patent No.: US 8,628,119 B2
(45) Date of Patent: Jan. 14, 2014

(54) TUBE CONNECTOR

(75) Inventors: Masahiro Hasunuma, Saitama (JP); Hiroshi Imai, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 349 days.

(21) Appl. No.: 12/470,039

(22) Filed: May 21, 2009

(65) Prior Publication Data

US 2009/0289449 A1  Nov. 26, 2009

(30) Foreign Application Priority Data

May 23, 2008 (JP) ................................ 2008-135566

(51) Int. Cl.
*F16L 27/00* (2006.01)

(52) U.S. Cl.
USPC .......................................... 285/276; 285/316

(58) Field of Classification Search
USPC .................. 285/276, 304, 308, 316, 317, 318
See application file for complete search history.

(56) References Cited

U.S. PATENT DOCUMENTS

| 5,390,963 | A | * | 2/1995 | Namekawa ..................... 285/86 |
| 5,730,185 | A | * | 3/1998 | Wilkins et al. ............. 137/614.2 |
| 6,129,334 | A | * | 10/2000 | Kuwabara ................. 251/149.6 |
| 7,762,593 | B2 | * | 7/2010 | Le Bars et al. ................ 285/316 |

FOREIGN PATENT DOCUMENTS

| EP | 0079274 A1 | * | 5/1983 | ................... 285/317 |
| JP | 51-056023 A | | 5/1976 | |
| JP | 51-151436 A | | 12/1976 | |
| JP | 58-004888 U | | 1/1983 | |
| JP | 60-014387 | | 1/1985 | |
| JP | 63-048089 U | | 4/1988 | |
| JP | 2001-192099 | | 7/2001 | |
| JP | 2006-036348 A | | 2/2006 | |

OTHER PUBLICATIONS

Japan Patent Office, Notice of Reason of Rejection for Application No. 2008-135566, drafted Oct. 11, 2012, 9 pages, Japan.

* cited by examiner

*Primary Examiner* — Michael P Ferguson
*Assistant Examiner* — Gwendolyn Driggers
(74) *Attorney, Agent, or Firm* — Alston & Bird LLP

(57) ABSTRACT

A tube connector that allows for a secure connection between a plug and a socket is provided. An accommodation space is provided such that, when the plug is inserted into an insertion hole of the socket while a sleeve is lifted upward to a base-end position, if a ball rolls on an outer periphery of the plug so as to come into abutment with a projection, the accommodation space entirely accommodates the ball at a side adjacent to the socket relative to the outer periphery of the plug.

2 Claims, 7 Drawing Sheets

US 8,628,119 B2

TUBE CONNECTOR

CROSS REFERENCE TO RELATED APPLICATIONS

This application is based on Japanese Patent Application No. 2008-135566, the content of which is incorporated herein by reference.

FIELD OF THE INVENTION

The present invention relates to a tube connector such as a liquid-container connector for delivering a liquid in a liquid container to the outside.

BACKGROUND OF THE INVENTION

Generally, liquids like high-purity agents for use in semiconductor manufacturing and common chemical agents are poured into liquid containers, such as polyethylene tanks, at the production plant, and the openings used as inlets and outlets formed in these liquid containers are covered with lids before the liquid containers are shipped out. A known method for extracting the liquid contained in such a liquid container is a siphon-tube method in which gas, such as air, is introduced into the container so that the liquid can be forced outward from the container by the pressure of the gas.

In this siphon-tube method, the lid attached to the opening of the liquid container is first removed, and then a siphon tube serving as a liquid channel and a plug having a gas supply channel are attached to the opening. Subsequently, a socket joinable to a tube for extracting the liquid from the liquid container to the outside and to a tube for introducing gas is connected to the plug, thereby forming a liquid channel for extracting liquid and a gas channel introducing gas. A liquid-container connector of this type is disclosed in, for example, Japanese Unexamined Patent Application, Publication No. 2001-192099.

In Japanese Unexamined Patent Application, Publication No. 2001-192099, a connector equipped with a socket 101 and a plug 102 is provided on an upper surface of a container 104, as shown in FIG. 5 (corresponding to FIG. 4 in Japanese Unexamined Patent Application, Publication No. 2001-192099). An inner bag 103 that contains a liquid, such as a chemical solution, is disposed inside the container 104. A siphon tube 118 is disposed inside the inner bag 103. By introducing gas to the region outside the inner bag 103, the liquid can be delivered outward through the lower end of the siphon tube 118.

FIGS. 6A to 6C (corresponding to FIGS. 5A to 5C in Japanese Unexamined Patent Application, Publication No. 2001192099) illustrate a procedure for connecting the socket 101 and the plug 102. First, a terminal end of the plug 102 is inserted into a terminal end of the socket 101, as shown in FIG. 6A. As the plug 102 is inserted further into the socket 101, a bulge 108 presses balls 132 outward in the radial direction, as shown in FIG. 6B. The balls 132 then press a ring 124 upward against a biasing force of a sleeve spring 125 so as to form a gap between the ring 124 and a projection 123. The balls 132 fit themselves into this gap, thereby permitting further insertion of the plug 102. Further insertion of the plug 102, as shown in FIG. 6C, causes the balls 132 to engage with a ball engagement groove 107 and the sleeve spring 125 to bias the ring 124 so as to bring the ring 124 into abutment with the projection 123, thereby completing the insertion process. Since the balls 132 are in engagement with the ball engagement groove 107 of the plug 102 in this state, the balls 132 prevent the socket 101 from being detached even if the socket 101 is pulled upward.

The socket 101 can be pulled out by lifting a sleeve 121 upward, as shown in FIG. 7 (corresponding to FIG. 6 in Japanese Unexamined Patent Application, Publication No. 2001-192099). The projection 123 also moves upward with the lifting of the sleeve 121. This causes a gap to form between the projection 123 and a stopper ring 122 so that the balls 132 become movable into this gap. In consequence, the balls 132 disengage from the ball engagement groove 107 so as to release the locked state between the plug 102 and the socket 101, whereby the socket 101 can be pulled out from the plug 102.

Although the configuration of Japanese Unexamined Patent Application, Publication No. 2001-192099 allows for a smooth connecting process so long as the sleeve 121 is kept at a downward position without being pulled upward, as shown in FIGS. 6A to 6C, the connecting process may sometimes be performed while the sleeve 121 is pulled upward, depending on the user. In that case, the following problems can occur.

When the sleeve 121 is pulled upward, the balls 132 become positioned below the projection 123, as shown in FIG. 7. Since the balls 132 become freely movable without being restrained within ball-receiving holes 131 (see FIG. 8) formed in a socket body 120, the balls 132 tend to move radially inward so as to protrude inward from the ball-receiving holes 131. If the plug 102 is inserted into the socket 101 in this state, the inwardly protruding balls 132 will roll on the outer surface of the plug 102 (i.e., move from a two-dot chain line to a solid line in FIG. 8) so as to move to a relatively higher position of the sleeve 121 until they come into abutment with the projection 123, as shown in FIG. 8. When the balls 132 come into abutment with the projection 123 in this manner, the balls 132 become clamped between the projection 123 and the plug 102, preventing the plug 102 from being inserted any further into the socket 101. Such a clamped phenomenon of the balls is notable especially when the balls 132 move over past the bulge 108, as shown in FIG. 8.

BRIEF SUMMARY OF THE INVENTION

In view of the circumstances described above, an object of the present invention is to provide a tube connector that allows for a secure connection between a plug and a socket.

In order to achieve the aforementioned object, the present invention provides the following solutions.

A tube connector according to an aspect of the present invention includes a plug having a plug channel through which a fluid flows and a ball engagement groove with which a ball engages, the ball engagement groove being formed along an outer periphery of the plug; and a socket to be fitted around a terminal end of the plug and having a socket channel that forms a channel for the fluid together with the plug channel. The socket includes a tubular socket body and a sleeve. The socket body has an insertion hole into which the terminal end of the plug is inserted and a ball-receiving hole capable of receiving the ball. The sleeve is provided on an outer periphery of the socket body and reciprocable relative to the socket body in an axial direction between a base-end position and a terminal-end position. The sleeve is provided with a projection that projects radially inward. When the plug and the socket are fitted to each other while the sleeve is set in the terminal-end position, the projection causes the ball disposed within the ball-receiving hole to engage with the ball engagement groove of the plug so as to regulate relative movement between the plug and the socket in the axial direction and secure the plug and the socket to each other. An accommodation space is provided such that, when the plug is inserted into the insertion hole of the socket while the sleeve is set in the base-end position, if the ball rolls on the outer periphery of the plug so as to come into abutment with a wall that forms the ball-receiving hole and/or with the projection, the accommodation space entirely accommodates the ball at a side adjacent to the socket relative to the outer periphery of the plug.

When the plug is inserted into the insertion hole of the socket while the sleeve is set in the base-end position, the ball disposed within the ball-receiving hole rolls on the outer periphery of the plug while abutting thereon. The ball rolls within the ball-receiving hole until it is stopped by the wall that forms the ball-receiving hole or until it is stopped by coming into abutment with the projection of the sleeve. Since an accommodation space that entirely accommodates the ball at a side adjacent to the socket relative to the outer periphery of the plug is provided, the ball is prevented from being clamped between the projection of the sleeve and the plug. In consequence, the plug and the socket can be connected to each other even when the sleeve is set in the base-end position.

In the tube connector according to the aspect of the present invention, a stopper ring may be provided on an outer periphery of a terminal end of the socket body and be configured to abut on the projection of the sleeve so as to define the terminal-end position of the sleeve. Moreover, the stopper ring may be provided with a ball abutment section that guides the ball radially inward when the ball comes into abutment with the ball abutment section.

The stopper ring may abut on the projection of the sleeve so as to define the terminal-end position of the sleeve. Preferably, a resilient member such as a spring may be used to bias the sleeve towards the terminal end so as to bring the projection into abutment with the stopper ring, whereby the sleeve can be set in the terminal-end position when in its normal state.

When the socket and the plug are to be connected to each other while the sleeve is set in the base-end position, the projection is moved away from the stopper ring as the sleeve is shifted to the base-end position. Therefore, the ball accommodated within the accommodation space becomes positioned between the projection and the stopper ring. When the plug is inserted into the socket in this state, the sleeve is returned to the terminal-end position from the base-end position upon completion of the insertion process. In this case, there is a possibility that the ball may get clamped between the projection and the stopper ring or between the projection and the wall that forms the ball-receiving hole. If such clamping of the ball occurs, the sleeve cannot be returned to the terminal-end position, preventing the ball from being brought into engagement with the ball engagement groove of the plug using the projection. As a result, the socket and the plug cannot be secured to each other.

In light of this, the stopper ring may be provided with a ball abutment section that guides the ball radially inward when the ball comes into abutment with the ball abutment section. Thus, the ball can be guided radially inward by the ball abutment section so as to be moved away from the projection, thereby preventing the ball from being clamped by the projection. In consequence, even when the plug is inserted into the socket while the sleeve is set in the base-end position, the sleeve can be returned to the terminal-end position upon completion of the insertion process. Thus, the socket and the plug can be properly secured to each other.

In the tube connector according to the aspect of the present invention, the ball abutment section may be defined by an inner peripheral edge that abuts on an outer side of the ball relative to a center thereof.

With the inner peripheral edge of the projection abutting on the outer side of the ball relative to the center thereof, the center of gravity of the ball is positioned inward of the inner peripheral edge, thereby causing the ball to roll radially inward. Such an inner peripheral edge can be obtained by, for example, increasing the height of the stopper ring in the axial direction as well as the dimension of the stopper ring in the radial direction so that the inner peripheral edge is positioned on the outer side of the ball relative to the center thereof.

The tube connector according to the present invention provides the following advantages.

The plug and the socket can be securely connected to each other even when the sleeve is set in the base-end position.

After the plug is inserted into the socket while the sleeve is set in the base-end position, the sleeve can be properly returned to the terminal-end position.

DETAILED DESCRIPTION OF THE INVENTION

Figure 1:
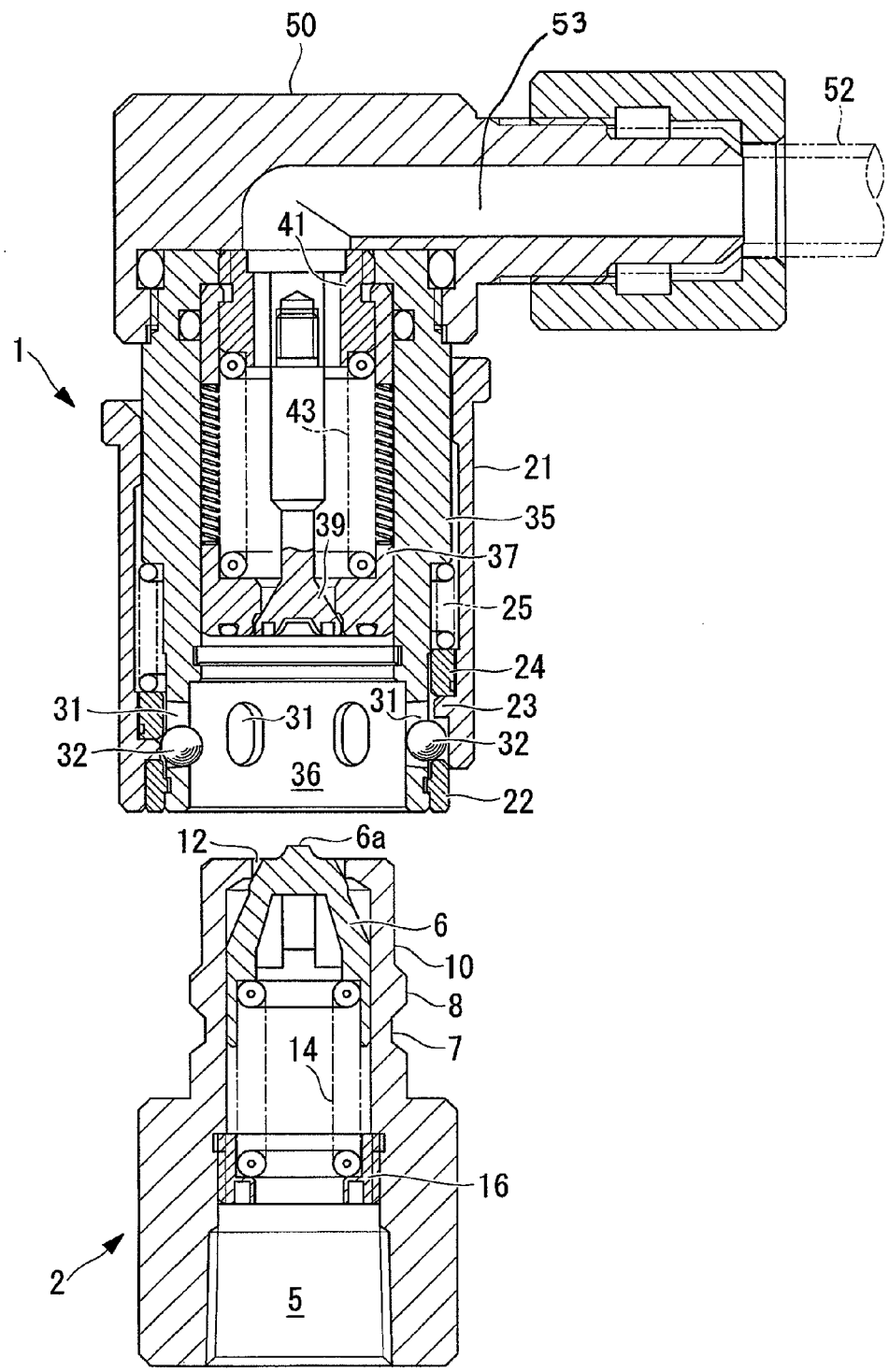
FIG. 1 is a longitudinal sectional view of a connector according to an embodiment of the present invention, showing a socket and a plug in a disconnected state.

A liquid-container connector, which corresponds to a tube connector according to an embodiment of the present invention, will be described below with reference to FIGS. 1 to 4.

The tube connector according to this embodiment is used for the same purpose as the connector of the related art described above with reference to FIGS. 5 to 8, and is similar to the connector of the related art in having a projection and balls that allow a plug to be inserted into a socket while a sleeve is kept at a terminal-end position. Therefore, similar components are denoted by reference numerals obtained by subtracting a value of 100 from the reference numerals used in FIGS. 5 to 8. However, the connector according to this embodiment significantly differs from the connector of the related art in that the plug can be inserted into the socket even in a state where the sleeve is pulled upward to a base-end position. Therefore, the following description will be directed to this feature.

Figure 2:
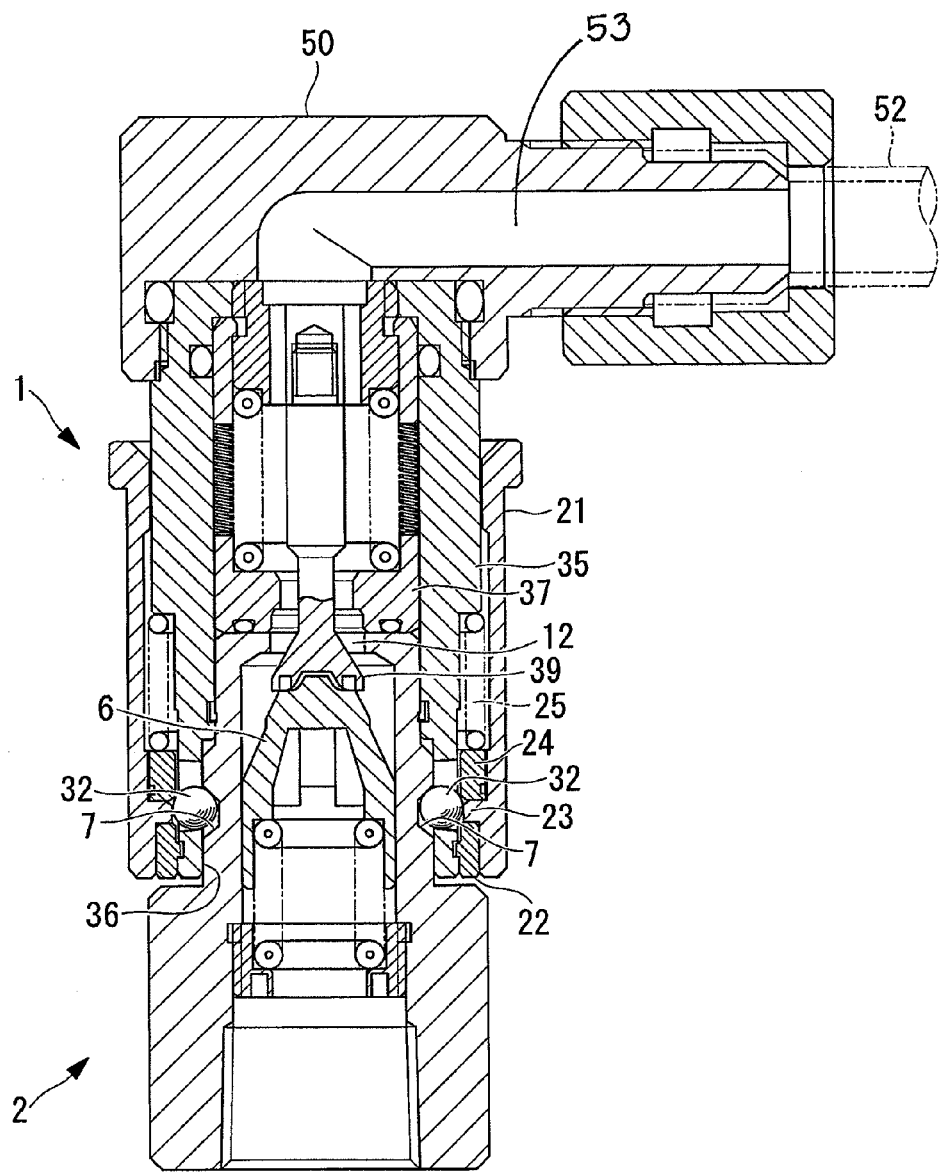
FIG. 2 is another longitudinal sectional view of the connector according to the embodiment of the present invention, showing the socket and the plug in a connected state.

FIGS. 1 and 2 are longitudinal sectional views of a liquid-container connector (i.e., a tube connector). FIG. 1 shows a socket 1 and a plug 2 in a disconnected state, whereas FIG. 2 shows the socket 1 and the plug 2 in a connected state. In FIG. 1, the right half of the socket 1 is shown in a state where a sleeve 21 is pulled upward to a base-end position, whereas the left half is shown in a state where the sleeve 21 is returned to a terminal-end position.

The plug 2 includes a substantially cylindrical plug body 10 having a plug channel 5 for liquid-delivering formed along the center axis thereof. The lower end of the plug body 10 is connected to, for example, a siphon tube (not shown) similar to that denoted by reference numeral 118 in FIG. 5, so that the siphon tube is in communication with the plug channel 5. A base end of the plug body 10, shown as a lower end in the drawings, is connected to a container (not shown). A liquid outlet 12 is formed at a terminal end (i.e., an upper end in the drawings) of the plug body 10.

A plug valve 6 is disposed near the terminal end of the plug channel 5. A protrusion 6a (a terminal end) that protrudes upward is provided in the center of a terminal-end surface of the plug valve 6. The plug valve 6 tapers toward its terminal end such that the diameter thereof is smaller toward the terminal end. This tapered portion of the plug valve 6 is fitted into the liquid outlet 12 so that the liquid channel is sealed. A base end of the plug valve 6 is connected to an upper end of a compression spring 14. A lower end of the compression spring 14 is fixed to the plug body 10 by means of a spring retaining member 16. The compression spring 14 biases the plug valve 6 towards the terminal end of the plug body 10 so that the liquid outlet 12 can be blocked by the plug valve 6 when in a normal state.

The outer surface of the plug body 10 is provided with a large-diameter bulge 8 and a ball engagement groove 7 located on the base-end side of this bulge 8.

The socket 1 includes a substantially cylindrical socket body 35 and the aforementioned sleeve 21 provided on the outer periphery of this socket body 35.

The socket body 35 has a hole extending therethrough in the axial direction thereof, and a bellows member 37 expandable and contractible in the axial direction is provided within this hole. A socket valve 39 is accommodated within this bellows member 37. A base end (i.e., an upper end in the drawings) of the socket valve 39 is fixed to the socket body 35 by means of a fixing component 41. This fixing component 41 is also used for fixing a base end (i.e., an upper end in the drawings) of the bellows member 37 to the socket body 35. A compression spring 43 is provided between the socket valve 39 and the bellows member 37. The bellows member 37 is expandable in its normal state due to this compression spring 43. Consequently, the socket valve 39 and the bellows member 37 engage with each other so as to seal a liquid channel.

A terminal end (i.e., a lower end in the drawings) of the socket body 35 is provided with an insertion hole 36 into which the terminal end of the plug 2 can be inserted. A wall that forms this insertion hole 36 is provided with ball-receiving holes 31. The ball-receiving holes 31 have an elliptic shape with the longitudinal axis extending in the axial direction, and are arranged at predetermined intervals in the circumferential direction. The ball-receiving holes 31 are formed in the wall and are tapered such that the diameter of each hole 31 increases from the inner side towards the outer side of the wall. Individual balls 32 are disposed in the respective ball-receiving holes 31. The balls 32 can move to where they protrude inward from the ball-receiving holes 31 (see the position of the ball 32 on the left side in FIG. 1). However, the balls 32 are given a diameter that prevents them from falling out of the ball-receiving holes 31 to the inner side thereof.

A stopper ring 22 is fixed around the lower end of the socket body 35. The terminal-end position of the sleeve 21 is defined by this stopper ring 22.

The sleeve 21 reciprocates in the axial direction between the base-end position in which the sleeve 21 is lifted upward (i.e., the position shown on the right side in FIG. 1) and the terminal-end position in which the sleeve 21 is lowered (i.e., the position shown on the left side in FIG. 1). The sleeve 21 is provided with an inward projection 23 near the terminal end thereof. When the sleeve 21 is set in the terminal-end position, the projection 23 is located at a position where its undersurface (i.e., the surface facing towards the terminal end) abuts on the stopper ring 22 while its inner surface presses the balls 32 inward from the outer side.

When the sleeve 21 is set in the base-end position, the projection 23 is positioned away from the stopper ring 22 so as to accommodate the balls 32 therebelow. As shown on the right side in FIG. 1, the stopper ring 22 is given a height (i.e., a dimension in the axial direction) such that, when an inner peripheral edge 22a (see FIG. 4) of the stopper ring 22 and the balls 32 are in abutment with each other, the inner peripheral edge 22a abuts on the lower side as well as the outer side of the balls 32 relative to the center thereof. In other words, the height is set such that the stopper ring 22 partially overlaps the terminal-end side of the ball-receiving holes 31 in the axial direction.

A ring 24 movable in the axial direction is disposed between the socket body 35 and the sleeve 21. This ring 24 is biased downward (i.e., toward the terminal end) by a sleeve spring 25. Thus, the ring 24 pressed downward by the sleeve spring 25 abuts on the upper surface of the projection 23. Since the projection 23 is pressed down towards the terminal end by the sleeve spring 25 via the ring 24, the sleeve 21 is normally set in the terminal-end position when in a no-load state.

The base end (i.e., the upper end in the drawings) of the socket 1 is connected to one end of an elbow 50 having a socket channel 53 for liquid-delivering, and the other end of the elbow 50 is connectable to a chemical-solution supply tube 52.

A connected state of the socket 1 and the plug 2 will now be described with reference to FIG. 2. In this connected state, the liquid channels are in communication with each other so that a chemical solution in the container can be delivered to the outside.

As shown in FIG. 2, the socket 1 is fitted around the terminal end of the plug 2 such that the insertion hole 36 in the socket 1 encompasses the terminal end of the plug 2.

The sleeve 21 is set in the terminal-end position by the biasing force of the sleeve spring 25, whereby the projection 23 of the sleeve 21 is positioned in place by being in abutment with the upper end of the stopper ring 22.

In this connected state, the terminal end of the plug body 10 is in abutment with the terminal end of the bellows member 37 so that the bellows member 37 is pressed upward. Thus, the socket valve 39 is opened by being positioned away from the bellows member 37. The socket valve 39 presses the plug valve 6 downward so as to open the liquid outlet 12. A liquid channel is formed in this manner in the connected state shown in FIG. 2 so that the chemical solution in the container can be delivered to the outside.

As shown in FIG. 2, the balls 32 are partly fitted in the ball engagement groove 7 formed along the outer periphery of the plug 2. On the other hand, the projection 23 of the sleeve 21 is located on the back side (i.e., the outer side) of the balls 32 so as to prevent the balls 32 from being disengaged from the ball engagement groove 7. In this case, the inner surface of the projection 23 is positioned so as to cover the center of the balls 32, in the height direction, in order to apply pressure thereto, thereby effectively preventing the balls 32 from falling out.

Figure 3:
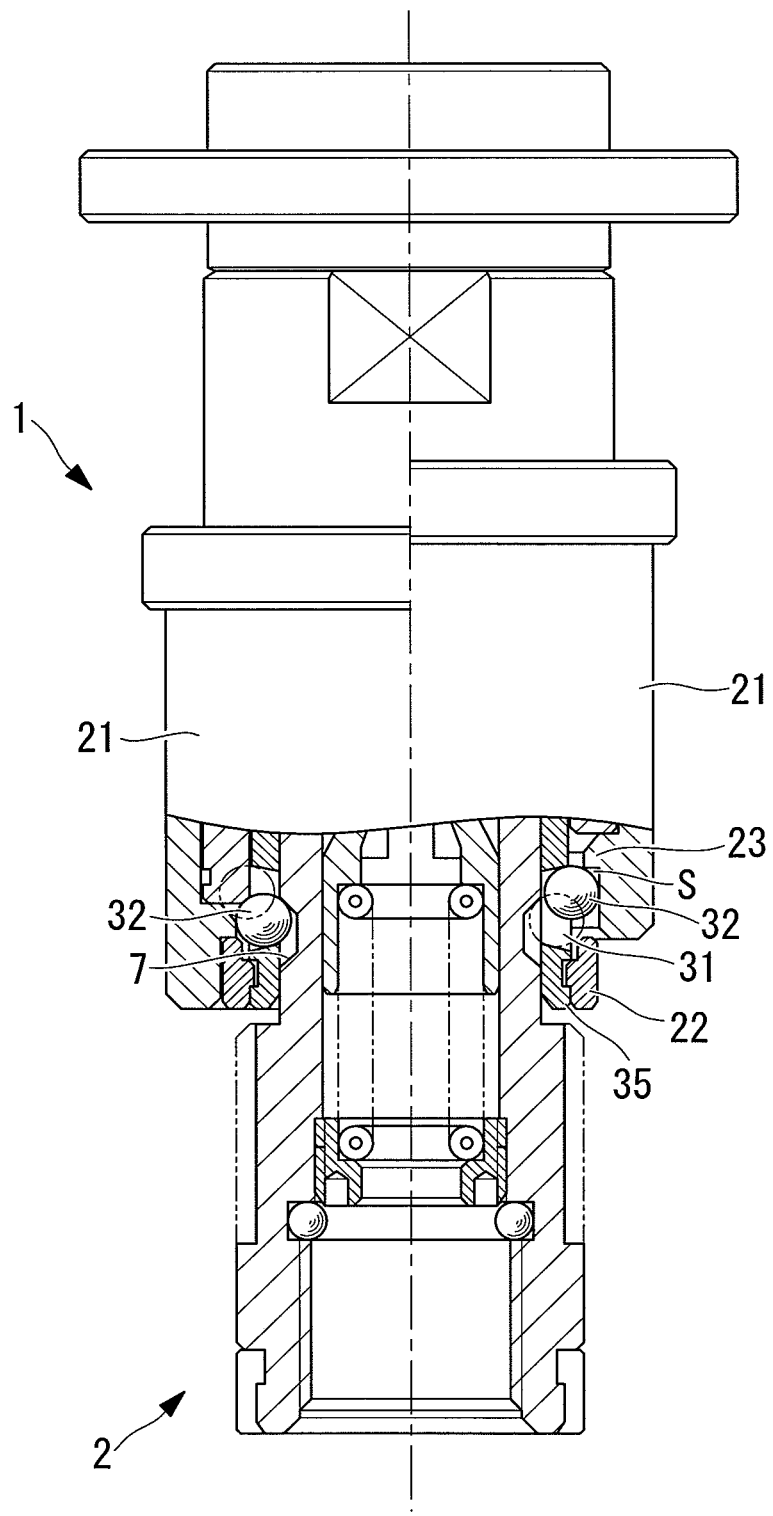
FIG. 3 is a longitudinal sectional view showing how the plug and the socket are connected to each other, and has a right part, relative to a center line, which shows a state where a sleeve is lifted upward to a base-end position and a left part, relative to the center line, which shows a state where the sleeve is returned to a terminal-end position.

FIG. 3 illustrates how the balls 32 are not clamped even when the plug 2 is inserted into the socket 1 while the sleeve 21 is kept in the base-end position. In FIG. 3, a right half (referred to as "right drawing" hereinafter) relative to the center line shows a state in which the sleeve 21 is set in the base-end position, whereas a left half (referred to as "left drawing" hereinafter) relative to the center line shows a state in which the sleeve 21 is returned to the terminal-end position.

As shown with a solid line in the right drawing, each ball 32 is entirely accommodated within an accommodation space S when the ball 32 abuts on an upper wall surface that forms the corresponding ball-receiving hole 31, the undersurface of the projection 23, and a lower inner surface of the sleeve 21. Since the ball 32 is entirely accommodated within this accommodation space S, the ball 32 is positioned radially outward relative to the outer periphery of the plug 2. Thus, the ball 32 is prevented from being clamped between the projection 23 of the sleeve 21 and the plug 2. The accommodation space S is formed by the upper wall surface that forms ball engagement groove 7, the undersurface of the projection 23, and the inner surface (near the terminal end) of the sleeve 21 located below the projection 23. For this reason, when trying to entirely accommodate the ball 32 without causing clamping of the ball 32, there is a possibility that the ball 32 may get clamped by being brought into abutment with either one of the upper wall surface forming the ball engagement groove 7 or the undersurface of the projection 23, whichever is set at a height (i.e., a position in the axial direction) lower (i.e., closer to the terminal end) than the other. Therefore, these surfaces are set at predetermined heights that prevent them from clamping the ball 32 even when the ball 32 comes into abutment with the surface set at the lower height. In this embodiment, these surfaces are set at the same height. In order to entirely accommodate the balls 32 without causing clamping of the balls 32, the distance between the inner surface of the sleeve 21 below the projection 23 and the inner surface of the socket body 35 needs to be set greater than or equal to the diameter of the balls 32.

Figure 4:
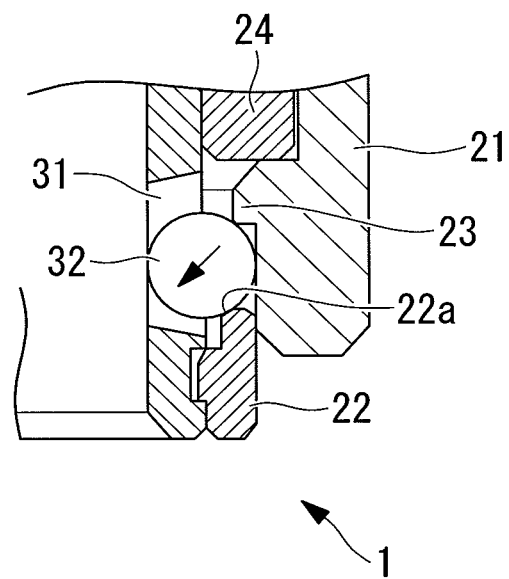
FIG. 4 is a partial longitudinal sectional view showing a state where a ball is made to roll radially inward by an inner peripheral edge of a stopper ring.
Figure 5:
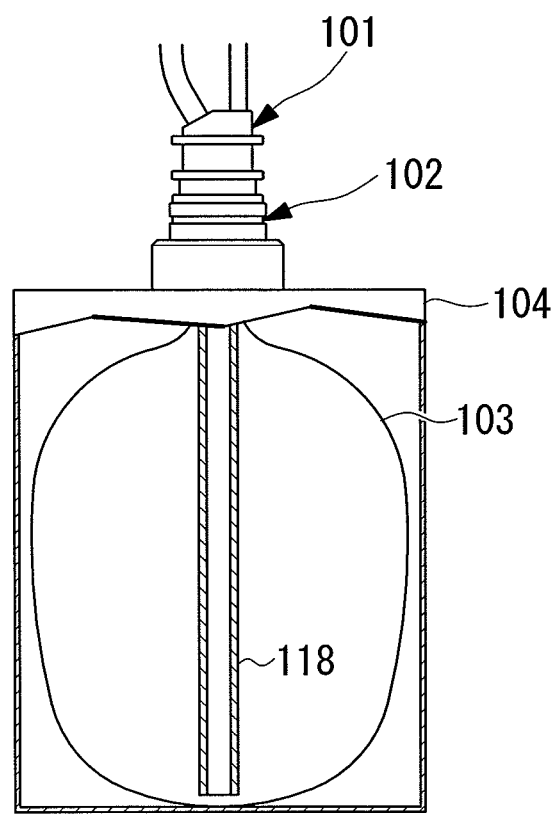
FIG. 5 is a partial cross-sectional view showing a container to which a connector of the related art equipped with a socket and a plug is attached.
Figure 6A:
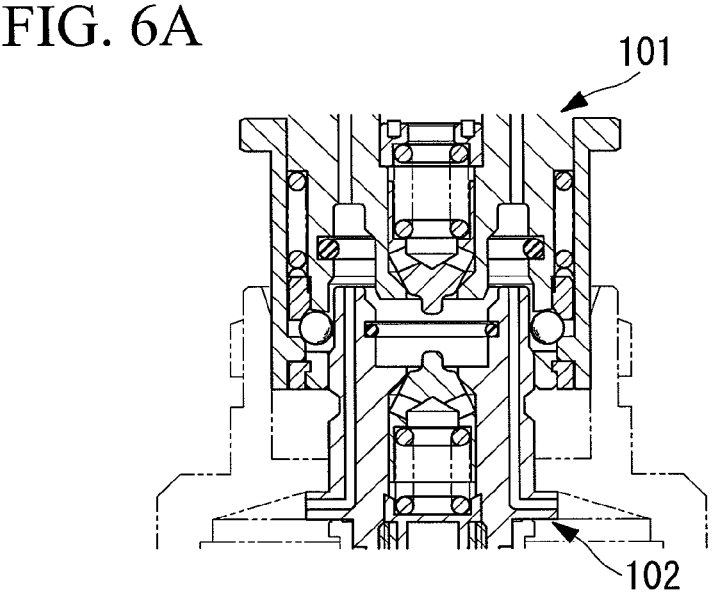
FIG. 6A is a longitudinal sectional view showing the movement of the socket and the plug of the related art during a connecting process thereof.
Figure 6B:
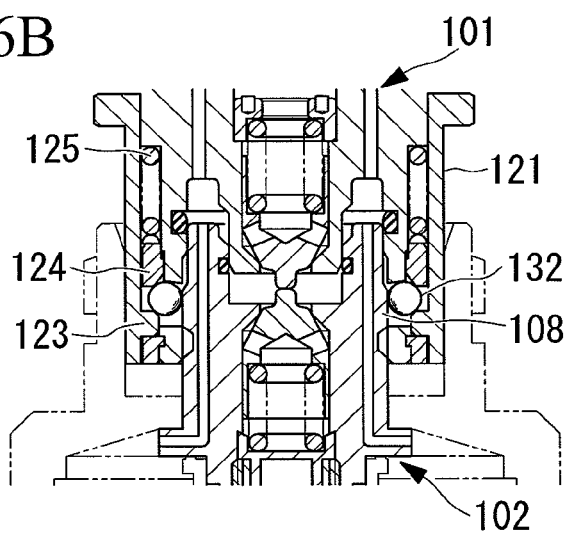
FIG. 6B is another longitudinal sectional view showing the movement of the socket and the plug of the related art during the connecting process thereof.
Figure 6C:
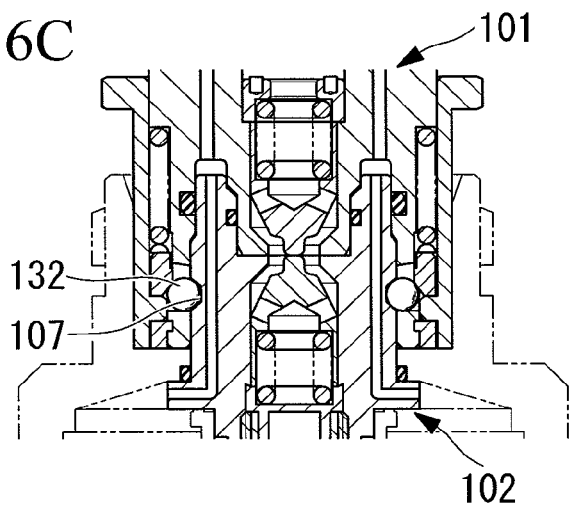
FIG. 6C is another longitudinal sectional view showing the movement of the socket and the plug of the related art during the connecting process thereof.
Figure 7:
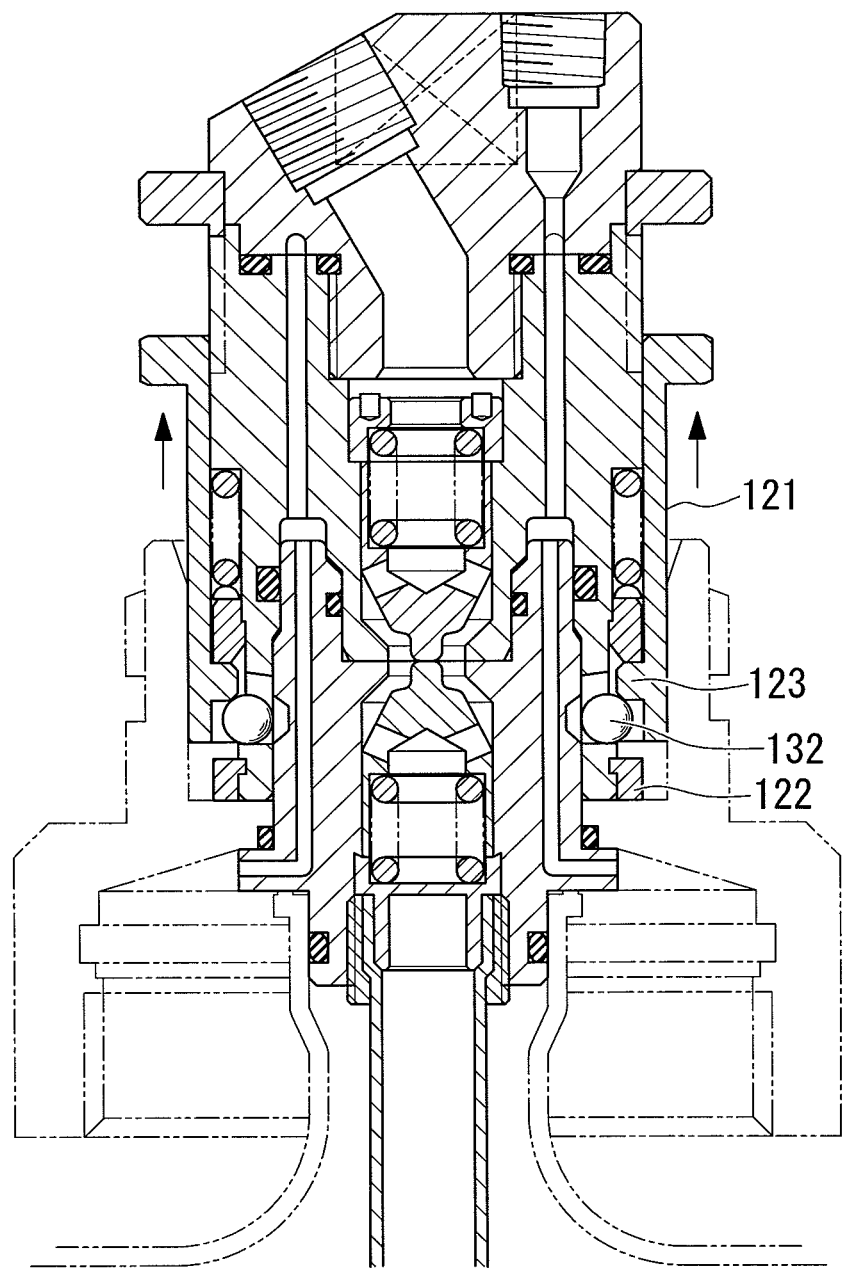
FIG. 7 is a longitudinal sectional view showing how the socket is detached from the plug by pulling a sleeve upward in the related art.
Figure 8:
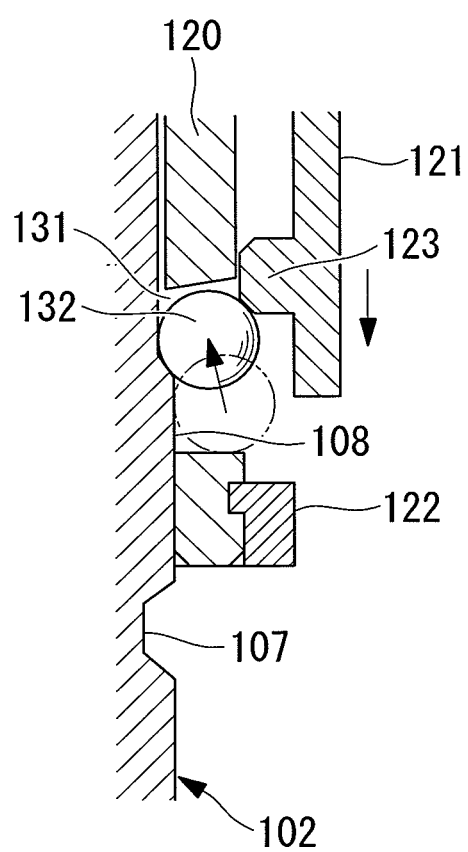
FIG. 8 is a partially enlarged longitudinal sectional view showing how a ball becomes clamped when the socket and the plug are connected to each other while the sleeve is pulled upward in the related art.

As shown in the left drawing, even when the sleeve 21 is returned to the terminal-end position after the insertion of the plug 2 into the socket 1, the balls 32 can smoothly fit into the ball engagement groove 7 by moving radially inward. FIG. 4 is a detailed view of how the balls 32 can move smoothly into the ball engagement groove 7.

The stopper ring 22 is given a height (i.e., a dimension in the axial direction) such that, when the inner peripheral edge (ball abutment section) 22a thereof and the balls 32 are in abutment with each other, the inner peripheral edge 22a abuts on the lower side as well as the outer side of the balls 32 relative to the center thereof. In other words, the height is set such that the stopper ring 22 partially overlaps the terminal-end side of the ball-receiving holes 31 in the axial direction.

Accordingly, when the inner peripheral edge 22a of the stopper ring 22 is in abutment with the balls 32, the inner peripheral edge 22a abuts on the lower side as well as the outer side of the balls 32 relative to the center thereof. Therefore, the balls 32 are made to roll downward and radially inward (i.e., in a lower-left direction as shown with an arrow in FIG. 4). In consequence, the balls 32 partly protrude inward from the ball-receiving holes 31 so as to properly engage with the ball engagement groove 7 formed in the plug 2.

Accordingly, the present embodiment provides the following advantages.

Since the accommodation space S is provided for entirely accommodating the balls 32 at the socket 1 side relative to the outer periphery of the plug 2, the balls 32 can be prevented from being clamped between the projection 23 of the sleeve 21 and the plug 2. In consequence, the plug 2 and the socket 1 can be connected to each other even when the sleeve 21 is set in the base-end position.

Since the stopper ring 22 is provided with the inner peripheral edge 22a that guides the balls 32 radially inward when in abutment with the balls 32, the balls 32 can be guided radially inward so as to be moved away from the projection 23, thereby preventing the balls 32 from being clamped by the projection 23. In consequence, even when the plug 2 is inserted into the socket 1 while the sleeve 21 is set in the base-end position, the sleeve 21 can be returned to the terminal-end position upon completion of the insertion process. Thus, the socket 1 and the plug 2 can be properly secured to each other.

Since the inner peripheral edge 22a of the stopper ring 22 is made to abut on the lower side as well as the outer side of the balls 32 relative to the center thereof, the balls 32 can be made to smoothly roll inward.

Although the embodiment described above is directed to a connector that forms only a channel for delivering a chemical solution, the present invention can be similarly applied to a connector having a gas channel in addition to a liquid channel, like the connector described in the related art.

What is claimed is:

1. A tube connector comprising:
a plug having a plug channel through which a fluid flows and a ball engagement groove with which a ball engages, the ball engagement groove being formed along an outer periphery of the plug; and
a socket to be fitted around a terminal end of the plug and having a socket channel that forms a channel for the fluid together with the plug channel,
wherein the socket includes a tubular socket body and a sleeve, the socket body having an insertion hole into which the terminal end of the plug is inserted and a ball-receiving hole capable of receiving the ball, the ball-receiving hole being formed in an elliptic shape with the longitudinal axis extending in an axial direction and being tapered so that the diameter of the ball-receiving hole increases from an inner side towards an outer side of a wall that forms the ball-receiving hole, the sleeve being provided on an outer periphery of the socket body and reciprocable relative to the socket body in the axial direction between a base-end position and a terminal-end position, the sleeve being provided with a projection that projects radially inward,
wherein a stopper ring is fixed to an outer periphery of a terminal end of the socket body and is configured to abut on the projection of the sleeve so as to define the terminal-end position of the sleeve, wherein an inner peripheral edge of the stopper ring is provided with a ball abutment section that guides the ball radially inward when the ball comes into abutment with the ball abutment section, wherein when the plug and the socket are fitted to each other while the sleeve is set in the terminal-end position, the projection causes the ball disposed within the ball-receiving hole to engage with the ball engagement groove of the plug so as to regulate relative movement between the plug and the socket in the axial direction and secure the plug and the socket to each other, wherein an accommodation space is formed by an upper wall surface of the ball engagement groove, an undersurface of the projection, and an inner surface of the sleeve located near the terminal end of the projection, a distance between the inner surface of the sleeve located near the terminal end of the projection and the inner surface of the socket body being greater than or equal to the diameter of the ball, wherein when the plug is inserted into the insertion hole of the socket while the sleeve is set in the terminal-end position, the ball rolls on the outer periphery of the plug so as to entirely accommodate the ball within the accommodation space formed at the base-end position side of the projection at a side adjacent to the socket relative to the outer periphery of the plug, wherein when the plug is inserted into the insertion hole of the socket while the sleeve is set in the base-end position, if the ball rolls on the outer periphery of the plug so as to come into abutment with a wall that forms the ball-receiving hole or with the projection, the accommodation space entirely accommodates the ball at a side adjacent to the socket relative to the outer periphery of the plug, wherein when the sleeve is set in the base-end position, the projection is positioned away from the stopper ring so as to accommodate the ball therebelow, and when the ball abutment section of the stopper ring and the ball are in abutment with each other, the height of the stopper ring is set such that the stopper ring partially overlaps the terminal-end side of the ball-receiving hole in the axial direction to abut the ball abutment section with a lower side as well as an outer side of the ball relative to a center thereof, wherein the ball abutment section is provided to overlap with a lower part of the ball-receiving hole, and wherein the ball is movable between the ball-receiving hole and the accommodation space.

2. The tube connector according to claim 1, wherein the ball abutment section is defined by an inner peripheral edge that abuts on an outer side of the ball relative to a center thereof.

* * * * *